US010022006B1

(12) United States Patent
Williams

(10) Patent No.: US 10,022,006 B1
(45) Date of Patent: Jul. 17, 2018

(54) CLAMPING SUPPORT ASSEMBLY

(71) Applicant: Chris Williams, Hurst, TX (US)

(72) Inventor: Chris Williams, Hurst, TX (US)

( * ) Notice: Subject to any disclaimer, the term of this patent is extended or adjusted under 35 U.S.C. 154(b) by 0 days.

(21) Appl. No.: 15/660,580

(22) Filed: Jul. 26, 2017

(51) Int. Cl.
B65B 67/12 (2006.01)
A47G 29/08 (2006.01)
F16M 13/02 (2006.01)
F16B 2/22 (2006.01)

(52) U.S. Cl.
CPC ............ A47G 29/083 (2013.01); F16B 2/22 (2013.01); F16M 13/022 (2013.01)

(58) Field of Classification Search
USPC .................................................. 248/95, 914
See application file for complete search history.

(56) References Cited

U.S. PATENT DOCUMENTS

| 1,220,717 | A | * | 3/1917 | Bennett | A47G 29/083 211/32 |
|---|---|---|---|---|---|
| 2,124,483 | A | | 7/1938 | Buttschau | |
| 2,461,071 | A | * | 2/1949 | Mettenleiter | A47G 29/083 24/343 |
| 2,516,760 | A | | 7/1950 | Doran | |
| 2,555,890 | A | * | 6/1951 | Korth | A44C 5/0046 224/219 |
| 2,565,719 | A | * | 8/1951 | Church | A47G 29/083 248/215 |
| 2,875,970 | A | * | 3/1959 | Gardner | A47G 29/06 248/101 |
| 3,300,168 | A | * | 1/1967 | Gaudino | B60R 7/08 24/326 |
| 3,376,006 | A | * | 4/1968 | Zezula | A47G 29/083 248/227.2 |
| 3,767,152 | A | * | 10/1973 | Killinger | A47G 29/083 24/298 |
| 3,799,416 | A | * | 3/1974 | Schmaltz | A45F 5/10 248/214 |
| 4,118,001 | A | * | 10/1978 | Serkez | A47G 29/083 24/601.5 |
| 4,210,302 | A | * | 7/1980 | Serkez | A45F 5/00 248/205.1 |
| 4,728,069 | A | | 3/1988 | Semcer | |
| D314,864 | S | | 2/1991 | Creed | |
| 5,314,151 | A | * | 5/1994 | Carter-Mann | B65B 67/1227 248/100 |
| 5,797,567 | A | * | 8/1998 | Magnafici | B65B 67/1227 248/101 |
| 6,345,796 | B1 | * | 2/2002 | Neuman | A47G 29/083 248/215 |
| 6,390,431 | B1 | * | 5/2002 | Ott | A45C 13/00 248/229.23 |
| 7,644,900 | B2 | | 1/2010 | Yap et al. | |
| 7,828,258 | B2 | * | 11/2010 | Shigio | A47G 29/083 223/120 |
| 8,308,125 | B2 | * | 11/2012 | Losaw | F16B 45/02 248/339 |
| 8,668,177 | B2 | * | 3/2014 | Stein | A47G 29/083 248/308 |

(Continued)

Primary Examiner — Monica E Millner

(57) ABSTRACT

A clamping support assembly for suspending an object from a platform includes a clamp that is selectively manipulated. The clamp is biased into a closed position to engage a platform. A hook is coupled to the clamp. An object is selectively suspended from the clamp thereby facilitating the object to be suspended from the platform.

6 Claims, 3 Drawing Sheets

(56) References Cited

U.S. PATENT DOCUMENTS

| | | | | |
|---|---|---|---|---|
| 9,080,715 B2* | 7/2015 | Biddle | ................. | F16M 13/022 |
| 9,631,771 B1* | 4/2017 | Abels | .................... | F16M 13/022 |
| 2005/0056746 A1* | 3/2005 | Landver | ............... | A47G 29/083 |
| | | | | 248/227.1 |
| 2012/0198680 A1* | 8/2012 | Durben | .................. | A47G 25/08 |
| | | | | 29/428 |
| 2013/0056602 A1* | 3/2013 | Zivku | .................. | A47G 29/083 |
| | | | | 248/339 |
| 2014/0284360 A1* | 9/2014 | Chorazewitz | ............. | A45F 5/02 |
| | | | | 224/148.7 |
| 2016/0355205 A1* | 12/2016 | Upton | ....................... | B62B 5/00 |

* cited by examiner

CLAMPING SUPPORT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to clamping devices and more particularly pertains to a new clamping device for suspending an object from a platform.

BRIEF SUMMARY OF THE INVENTION

An embodiment of the disclosure meets the needs presented above by generally comprising a clamp that is selectively manipulated. The clamp is biased into a closed position to engage a platform. A hook is coupled to the clamp. An object is selectively suspended from the clamp thereby facilitating the object to be suspended from the platform.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
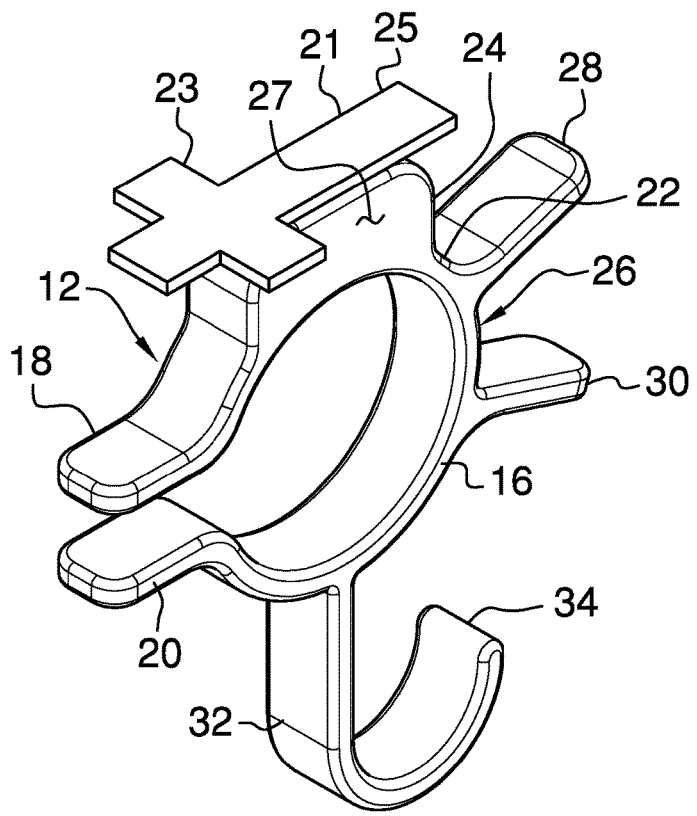
FIG. 1 is a front perspective view of a clamping support assembly according to an embodiment of the disclosure.
Figure 2:
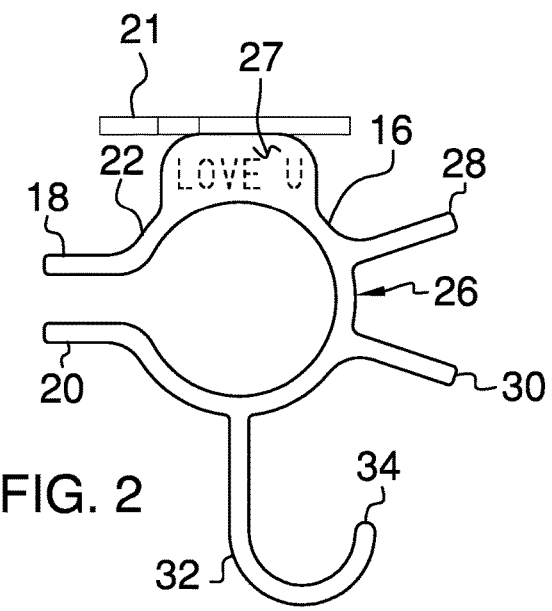
FIG. 2 is a left side view of an embodiment of the disclosure.
Figure 3:
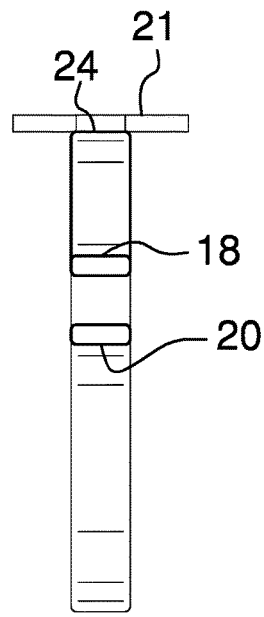
FIG. 3 is a front view of an embodiment of the disclosure.
Figure 4:
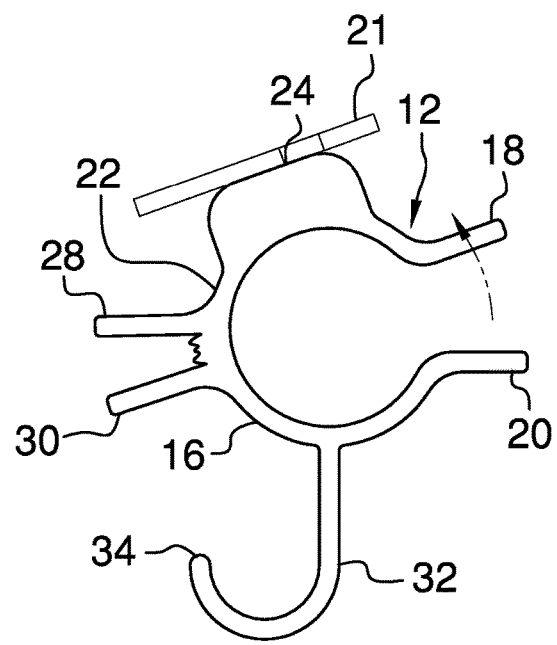
FIG. 4 is a right side view of an embodiment of the disclosure.
Figure 5:
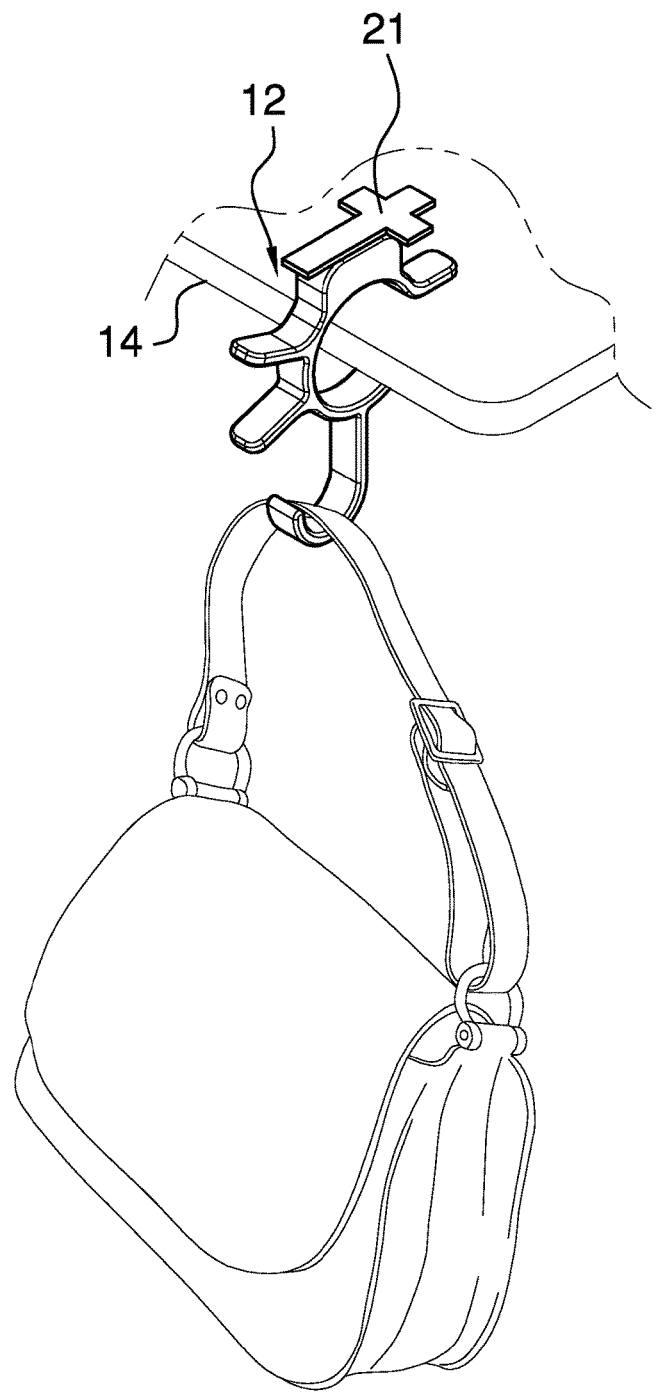
FIG. 5 is a perspective in-use view of an embodiment of the disclosure.

With reference now to the drawings, and in particular to FIGS. 1 through 5 thereof, a new clamping device embodying the principles and concepts of an embodiment of the disclosure and generally designated by the reference numeral 10 will be described.

As best illustrated in FIGS. 1 through 5, the clamping support assembly 10 generally comprises a clamp 12 that is selectively manipulated. The clamp 12 is biased into a closed position to engage a platform 14. The platform 14 may be a table top, a counter top and any other horizontally planar platform 14. The clamp 12 has a central portion 16 extending between a top finger 18 and a bottom finger 20. The central portion 16 is arcuate between each of the top 18 and bottom 20 portions such that the central portion 16 forms an open loop.

The top finger 18 is spaced from the bottom finger 20 and the top finger 18 is biased toward the bottom finger 20. Thus, each of the top 18 and bottom 20 fingers may frictionally engage an associated one of a top surface and a bottom surface of the platform 14. The central portion 16 has an outwardly facing surface 22 and a prominence 24 extends upwardly from the outwardly facing surface 22. Moreover, the prominence 24 is centrally positioned between the top finger 18 and a midpoint 26 of the central portion 16. The prominence 24 has a lateral surface 27 and indicia may be printed on the lateral surface 27. The indicia may comprise letters and the letters may spell "love u" or the like.

A cross 21 may be provided and the cross may be coupled to the prominence 24. Thus, the cross 21 may be displayed when the clamp 12 is manipulated to engage the platform 14. The cross 21 may have a first member 23 that intersects a second member 25 at a right angle. The first member 23 may have a length that is less than a length of the second member 25. Thus, the cross 21 may resemble the Christian cross.

A first tab 28 extends away from the outwardly facing surface 22 and the first tab 28 is selectively manipulated. The first tab 28 is positioned between the prominence 24 and the midpoint 26. A second tab 30 extends away from the outwardly facing surface 22 and the second tab 30 is selectively manipulated. The second tab 30 is positioned on an opposite side of the midpoint 26 with respect to the first tab 28. Each of the first tab 28 and the second tab 30 is selectively urged toward each other. In this way the top finger 18 is urged away from the bottom finger 20 thereby facilitating the platform 14 to be positioned between the top 18 and bottom 20 fingers. The central portion 16 may be comprised of a resiliently bendable material.

A hook 32 is coupled to the clamp 12 and an object 33 may be suspended from the hook 32. In this way the object 33 may be suspended from the platform 14. The object may be strap on a purse or the like. The hook 32 extends outwardly from the outwardly facing surface 22 of the central portion 16. Moreover, the hook 32 is centrally positioned between the second tab 30 and the bottom finger 20. The hook 32 has a distal end 34 with respect to the outwardly facing surface 22. The hook 32 is curved between the outwardly facing surface 22 and the distal end 34.

In use, each of the first 28 and second 30 tabs are urged toward each other thereby facilitating the top finger 18 of the clamp 12 to be urged away from the bottom finger 20 of the clamp 12. The clamp 12 is manipulated to position the platform 14 between the top 18 and bottom 20 portions. Each of the first 28 and second 30 tabs is released. Thus, the top 18 and bottom 20 fingers frictionally engage the platform 14. The object 33 is selectively suspended from the hook 32 for storage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A clamping support assembly being configured to engage a support thereby facilitating a purse to be suspended from the support, said assembly comprising:
   a clamp being configured to be manipulated, said clamp being biased into a closed position wherein said clamp is configured to engage a platform, said clamp having a central portion extending between a top finger and a bottom finger, said central portion being arcuate between each of said top and bottom fingers such that said central portion forms an open loop having said top finger being spaced from said bottom finger, said central portion having an outwardly facing surface, said central portion having a prominence extending upwardly from said outwardly facing surface, said prominence being centrally positioned between said top finger and a midpoint of said central portion;
   a first tab extending away from said outwardly facing surface wherein said first tab is configured to be manipulated, said first tab being positioned between said prominence and said midpoint; and
   a hook being coupled to said clamp wherein said hook is configured to have an object suspended therefrom thereby facilitating the object to be suspended from the platform.

2. The assembly according to claim 1, wherein said top finger is biased toward said bottom finger wherein each of said top and bottom fingers are configured to frictionally engage an associated one of a top surface and a bottom surface of the platform.

3. The assembly according to claim 1, further comprising a second tab extending away from said outwardly facing surface wherein said second tab is configured to be manipulated, said second tab being positioned on an opposite side of said midpoint with respect to said first tab.

4. The assembly according to claim 3, wherein each of said first tab and said second tab is selectively urged toward each other such that said top finger is urged away from said bottom finger wherein each of said top and bottom fingers is configured to have the platform positioned between said top and bottom fingers.

5. The assembly according to claim 3, wherein said hook extends outwardly from said outwardly facing surface of said central portion, said hook being centrally positioned between said second tab and said bottom finger, said hook having a distal end with respect to said outwardly facing surface, said hook being curved between said outwardly facing surface and said distal end.

6. A clamping support assembly being configured to engage a support thereby facilitating a purse to be suspended from the support, said assembly comprising:
   a clamp being configured to be manipulated, said clamp being biased into a closed position wherein said clamp is configured to engage a platform, said clamp having a central portion extending between a top finger and a bottom finger, said central portion being arcuate between each of said top and bottom fingers such that said central portion forms an open loop having said top finger being spaced from said bottom finger, said top finger being biased toward said bottom finger wherein each of said top and bottom fingers are configured to frictionally engage an associated one of a top surface and a bottom surface of the platform, said central portion having an outwardly facing surface, said central portion having a prominence extending upwardly from said outwardly facing surface, said prominence being centrally positioned between said top finger and an midpoint of said central portion;
   a first tab extending away from said outwardly facing surface wherein said first tab is configured to be manipulated, said first tab being positioned between said prominence and said midpoint;
   a second tab extending away from said outwardly facing surface wherein said second tab is configured to be manipulated, said second tab being positioned on an opposite side of said midpoint with respect to said first tab, each of said first tab and said second tab being selectively urged toward each other such that said top finger is urged away from said bottom finger wherein each of said top and bottom fingers is configured to have the platform positioned between said top and bottom fingers; and
   a hook being coupled to said clamp wherein said hook is configured to have an object suspended therefrom thereby facilitating the object to be suspended from the platform, said hook extending outwardly from said outwardly facing surface of said central portion, said hook being centrally positioned between said second tab and said bottom finger, said hook having a distal end with respect to said outwardly facing surface, said hook being curved between said outwardly facing surface and said distal end.

* * * * *